United States Patent
Edsinger et al.

(10) Patent No.: US 9,400,035 B1
(45) Date of Patent: Jul. 26, 2016

(54) CYCLOID TRANSMISSION WITH AN ADJUSTABLE RING

(71) Applicant: Google Inc., Mountain View, CA (US)

(72) Inventors: Aaron Edsinger, Mountain View, CA (US); Andy Metzger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 79 days.

(21) Appl. No.: 14/275,984

(22) Filed: May 13, 2014

(51) Int. Cl.
  *F16H 1/32* (2006.01)
  *F16H 1/34* (2006.01)
(52) U.S. Cl.
  CPC .. *F16H 1/32* (2013.01); *F16H 1/34* (2013.01); *F16H 2001/323* (2013.01)
(58) Field of Classification Search
  CPC .............................. F16H 2001/323; F16H 1/34
  See application file for complete search history.

(56) References Cited

U.S. PATENT DOCUMENTS

| | | | | |
|---|---|---|---|---|
| 2,658,395 A * | 11/1953 | Coates | ............... | B60N 2/2252 475/158 |
| 4,271,726 A * | 6/1981 | Ryffel | ............... | F16H 1/32 418/61.3 |
| 4,487,091 A | 12/1984 | Pierrat | | |
| 5,145,468 A | 9/1992 | Nagabhusan | | |
| 2010/0216585 A1 * | 8/2010 | Imase | ............... | F16H 1/32 475/168 |
| 2011/0319217 A1 * | 12/2011 | Imase | ............... | F16H 1/32 475/168 |
| 2013/0205942 A1 * | 8/2013 | Chicurel Uziel | ........ | F16F 15/14 74/572.2 |

FOREIGN PATENT DOCUMENTS

WO    WO03/067022    8/2003

\* cited by examiner

*Primary Examiner* — Ramya Burgess
*Assistant Examiner* — Lillian Nguyen
(74) *Attorney, Agent, or Firm* — McDonnell Boehnen Hulbert & Berghoff LLP

(57) ABSTRACT

Examples are provided that describe a cycloid transmission with an adjustable ring. An example cycloid transmission includes a disc and a motor shaft attached to the disc. The motor shaft is capable of rotating the disc around an outer ring of rollers. The outer ring of rollers surrounds the disc. As the disc is rotated, contact is made between the disc and the outer ring of rollers. A cycloid transmission also comprises an adjustable ring that is interposed between the motor shaft and the disc. A circumference of the adjustable ring can be adjusted in order to cause expansion of a radius of the disc. This expansion will result in increased contact of the disc with the outer ring of rollers and thereby lower backlash during rotation of the disc.

14 Claims, 13 Drawing Sheets

US 9,400,035 B1

CYCLOID TRANSMISSION WITH AN ADJUSTABLE RING

BACKGROUND

Unless otherwise indicated herein, the materials described in this section are not prior art to the claims in this application and are not admitted to be prior art by inclusion in this section.

Use of electric motor actuators in a wide array of engineering design can be attributed to the ease of introducing motion and the need for preventing motion as required by a mechanism or system. An ability of actuators to enable control without the use of oil has also made actuators a popular choice in various implementations. Electric motor actuators for robotic and automation systems often require a transmission (speed reducer) in order to operate within speed-torque requirements of a specific application and of the motor.

As an example, an electric linear actuator may exhibit a high speed and fast response that is useful when high acceleration and an ability to brake quickly are needed. However, linear actuators tend to have a high cost, require a cooling option based on heat generated, and are limited by a length associated with a given application. As another example, a stepper motor has a capability to be highly reliable but with diminishing torque as a speed of the motor is increased. There continues to be a vast majority of robotic and automation systems being developed with the aid of electric motors that are capable of performing a rotational motion.

SUMMARY

In one example, a cycloid transmission is provided that comprises a disc and a motor shaft attached to the disc. The motor shaft is capable of rotating the disc. The cycloid transmission also comprises an outer ring of rollers that surrounds the disc. The outer ring of rollers contacts the disc as the disc rotates. The cycloid transmission also comprises an adjustable ring that is interposed between the motor shaft and the disc. A circumference of the adjustable ring can be adjusted in order to cause an expansion of a radius of the disc. The expansion of the radius of the disc will result in an increased contact of the disc to the outer ring of rollers and thereby lower backlash during rotation of the disc.

In another example, a cycloid transmission is provided that comprises a disc and a shaft attached to the disc. The disc includes a surface on an outside perimeter of the disc. The shaft is capable of rotating the disc. The cycloid transmission also comprises an outer ring of rollers that surrounds the disc. The outer ring of rollers contacts the disc as the disc rotates. The cycloid transmission also comprises a gap between the surface and the outer ring of rollers. The cycloid transmission also comprises an adjustable ring that includes an internal pressurized volume. An adjustable fastener may be inserted into the internal pressurized volume. Insertion of the adjustable fastener causes an increase in a pressure around a circumference of the adjustable ring. Based on an amount of insertion into the adjustable ring, the amount of insertion will cause expansion of a radius of the disc and decrease the gap between the surface and the outer ring of rollers. This will result in increased contact of the disc to the outer ring of rollers.

In another example, a cycloid transmission is provided that comprises a disc and an outer ring of rollers. The outer ring of rollers surrounds the disc and contacts the disc as the disc rotates. The cycloid transmission also comprises a primary housing that encompasses the outer ring of rollers. The cycloid transmission also comprises a secondary housing that encompasses the primary housing. The cycloid transmission also comprises an adjustable ring that is interposed between the primary housing and the secondary housing. The adjustable ring includes an internal pressurized volume. The internal pressurized volume is adjustable around a circumference of the adjustable ring. Adjustment of the internal pressurized volume around the circumference of the adjustable ring will cause a compression to be applied along an outside perimeter of the primary housing. The compression will further result in an increased contact of the disc to the outer ring of rollers.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a robotic end effector, including a cycloid transmission, to operate in a rotational manner for an extended period of time. The cycloid transmission may include a motor shaft that is attached to a disc for the purpose of rotating the disc. The disc may rotate around an outer ring of rollers that may surround the disc and are used to contact the disc as the disc rotates. An adjustable ring may be interposed between the motor shaft and the disc. The adjustable ring may have a circumference that can be adjusted. This adjustment in the circumference will permit a radial force to cause an expansion of a radius of the disc. As a result of an increased radius, the disc will have an increased contact to the outer ring of rollers. Due to the increased contact, a backlash associated with a movement of the disc may be lowered during rotation of the disc.

Figure 1A:
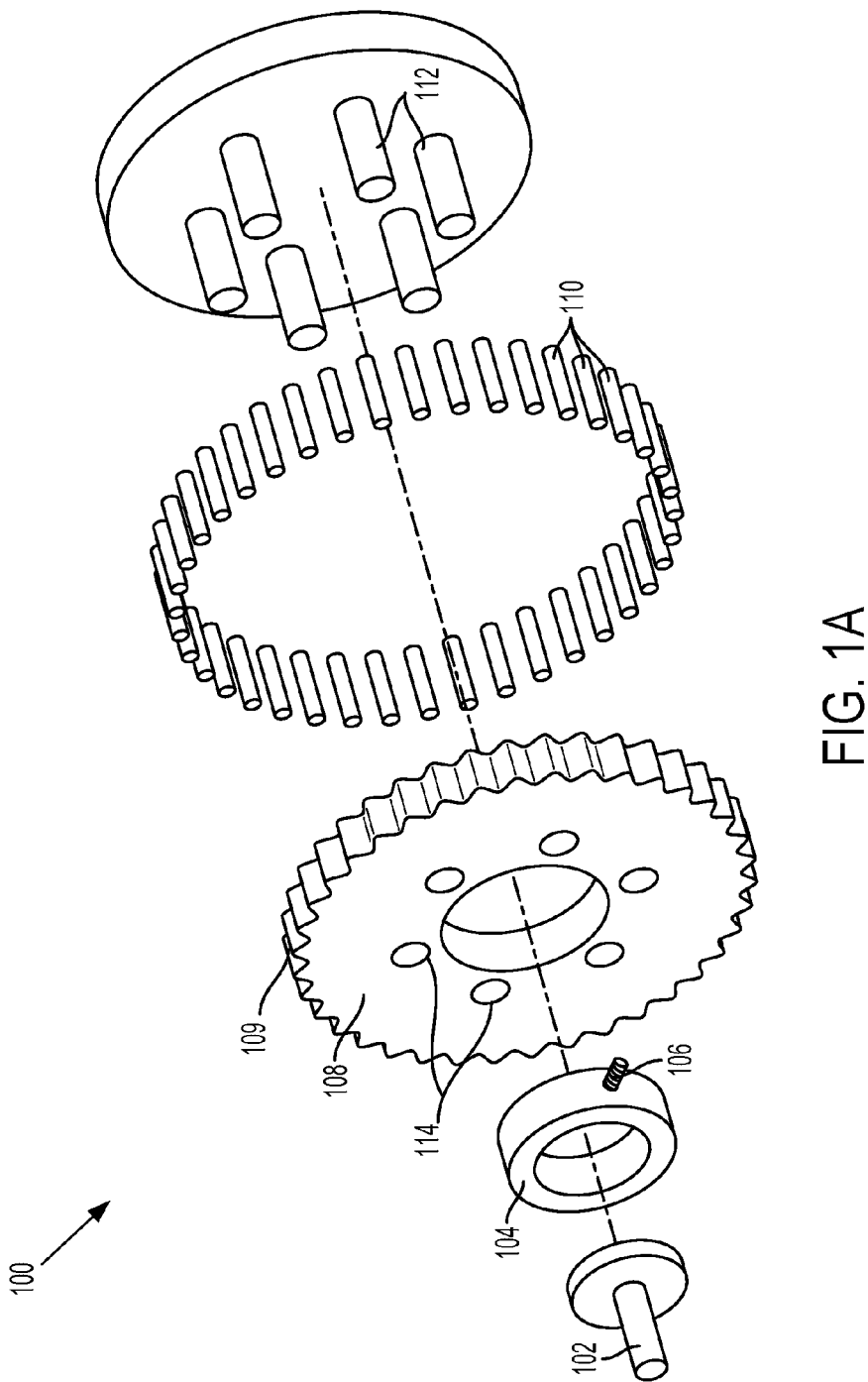
FIG. 1A illustrates an exploded view of an example cycloid transmission.

Referring now to the figures, FIG. 1A illustrates an exploded view of an example cycloid transmission 100. The cycloid transmission 100 comprises a motor shaft 102 for rotating a disc 108. The cycloid transmission 100 in FIG. 1A illustrates an adjustable ring 104 that is interposed between the motor shaft 102 and the disc 108.

Within the cycloid transmission 100, the adjustable ring 104 may be coupled to or attached to the disc 108. The adjustable ring 104 includes a set screw 106 that is inserted through the disc 108 and into the adjustable ring 104. Although not shown in FIG. 1A, a plurality of set screws can be inserted through the disc 108 and into the adjustable ring 104.

The adjustable ring 104 may be pressurized with either a gas or a fluid that will result in a pressure to be contained by the adjustable ring 104. The pressure contained by the adjustable ring 104 can be adjusted based on a position of the set screw 106 within the adjustable ring 104. As the position of the set screw 106 is adjusted through an application of an external rotational force, the pressure contained by the adjustable ring 104 may increase.

An outer ring of rollers 110 surrounds the disc 108. As the disc 108 rotates around the outer ring of rollers 110, a wobble/planetary movement will be reduced by a use of a plurality of output shaft rollers 112. The plurality of output shaft rollers 112 are coupled to the disc 108 and are inserted within positions 114 of the disc 108. The respective positions 114 may be in the form of a circular opening with a diameter greater than a diameter of a given output shaft roller of the plurality of the output shaft rollers 112. Although in FIG. 1A the plurality of output shaft rollers 112 is shown to be six, in other examples, the number associated with the plurality of output shaft rollers 112 may be increased or decreased based on a specific application requirement.

As is shown in FIG. 1A, the disc 108 is surrounded by the outer ring of rollers 110. The outer ring of rollers 110 contact the disc 108 as the disc 108 is rotated by the motor shaft 102.

The disc 108 may also comprise a plurality of teeth 109 as is shown in FIG. 1A. A given surface of the plurality of teeth 109 may wear away over a period of time due to a continuous contact between the plurality of teeth 109 and the outer ring of rollers 110. A gradual loss associated with an original shape of the plurality of teeth 109 may cause the cycloid transmission 100 to experience a backlash.

The cycloid transmission 100 may also experience backlash due to poor manufacturing tolerances associated with various components of the cycloid transmission 100. In one example, the disc 108 may come from a manufacturer with poor quality assurance associated with the manufacturing of a plurality of discs. In one example, a given disc from the plurality of discs could fail to engage properly with the outer ring of rollers 110 based on a smaller radius of the given disc from the plurality of discs due to poor manufacturing. The given disc from the plurality of discs could then cause the cycloid transmission 100 to experience a backlash.

In one example, as the motor shaft 102 rotates under normal operation, a heat that is generated based on a rotational movement may reach other components of the cycloid transmission 100. The heat may spread to the adjustable ring 104 based on the adjustable ring 104 being coupled to the motor shaft 102. The fluid within the adjustable ring 104 may be comprised of a silicone fluid that exhibits an increased viscosity when heated. An increase in a thickness of the fluid may further cause adjustment of a circumference of the adjustable ring 104. As the pressure contained by the adjustable ring 104 is adjusted, the pressure may cause an expansion of the radius of the disc 108 resulting in increased contact of the disc 108 to the outer ring of rollers 110.

Within examples, an increase in the pressure of the gas or fluid within the adjustable ring 104 may occur by adjustment of the set screw 106. The pressure contained by the adjustable ring 104 will increase if there is less of a volume available for the gas or fluid to occupy. In one example, the disc 108 may contain an opening that provides access to a planar surface of the set screw 106. By applying a rotational force to the planar surface of the set screw 106, the set screw 106 will occupy more of the volume available for the gas or fluid. With less volume available for the gas or fluid, the pressure contained by the adjustable ring 104 may be adjusted to cause an expansion of the radius of the disc 108.

In one example, a plurality of set screws may also be used in place of just the set screw 106 to cause an increase in the pressure contained by the adjustable ring 104. In one example, the plurality of set screws may be spaced equidistantly apart from each other. Adjusting the plurality of set screws will permit an increase contained by the adjustable ring 104 to be applied from each of the plurality of set screws.

Figure 1B:
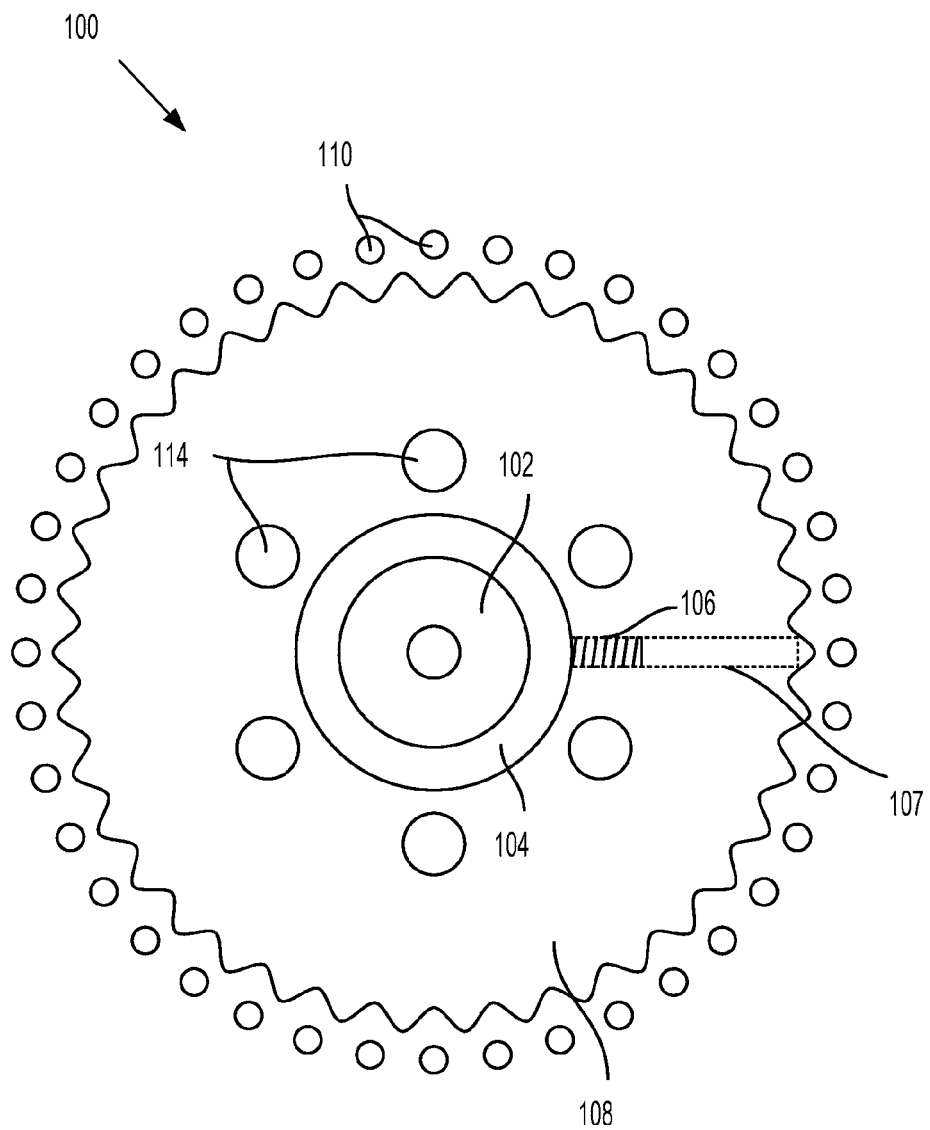
FIG. 1B illustrates a top view of another example cycloid transmission.

FIG. 1B illustrates a top view of the cycloid transmission 100. In one example, the adjustable ring 104 may be integrated with the disc 108 as is shown in FIG. 1B. A channel 107 within the disc 108 may provide access to the set screw 106. The channel 107 may allow adjustment of the set screw 106 and thereby cause an expansion of the radius of the disc 108.

The adjustable ring 104 is not limited to use in the cycloid transmission 100. There are many other gear trains that may experience backlash. Other gear trains would thereby benefit from the adjustable ring. Gear trains that comprise spur gears, bevel gears, and worm gears are just a few examples that may benefit in having a radius of a gear expanded through the use of the adjustable ring in order to improve contact between a plurality of gears.

Figure 2:
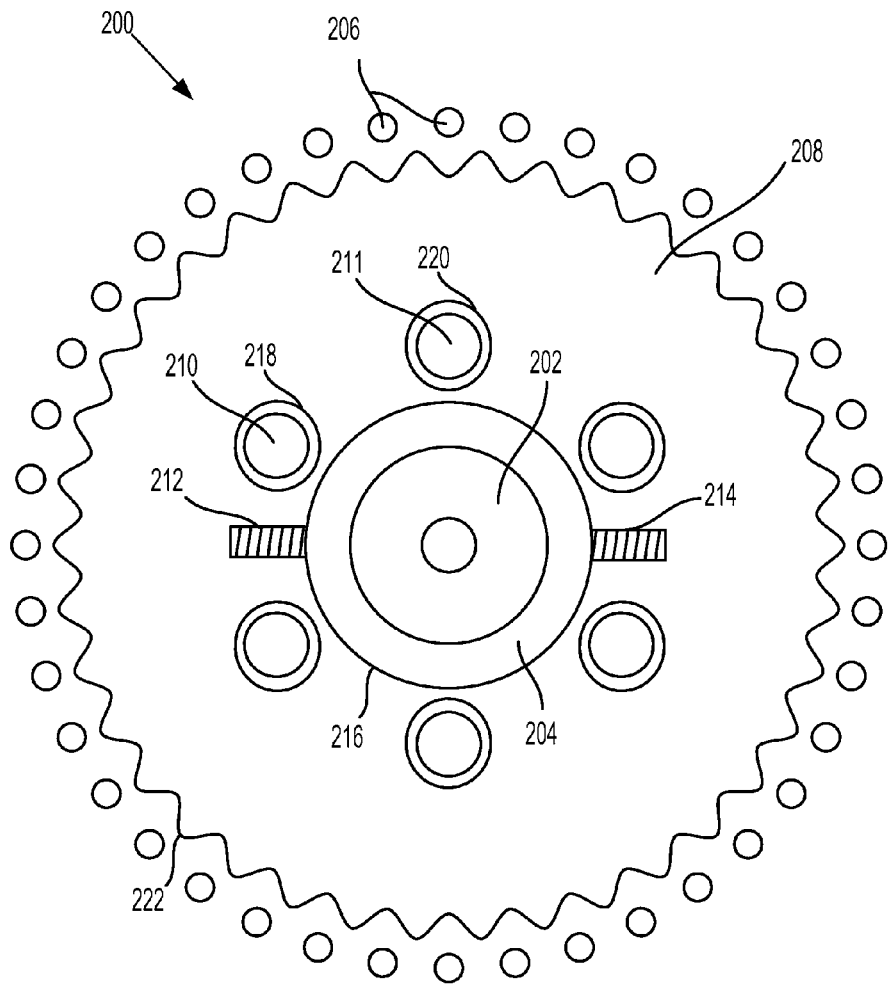
FIG. 2 illustrates an example cycloid transmission with a plurality of set screws.

FIG. 2 illustrates an example cycloid transmission 200. A top view of the cycloid transmission 200 is shown in FIG. 2. The cycloid transmission 200 comprises a motor shaft 202 that is capable of rotating a disc 208. An adjustable ring 204 is interposed between the motor shaft 202 and the disc 208.

The disc 208 comprises a plurality of circular openings 218 and 220. A plurality of output shaft rollers 210 and 211 are inserted through the plurality of circular openings 218 and 220. A diameter of a given circular opening 218 from the plurality of circular openings 218 and 220 is larger than a diameter of a given output shaft roller 210 from the plurality of output shaft rollers 210 and 211. This enables the plurality of output shaft rollers 210 and 211 to move around the plurality of circular openings 218 and 220 in order to stabilize a rotational motion of the disc 208.

An outer ring of rollers 206 surrounds the disc 208 as shown in FIG. 2. The outer ring of rollers 206 contacts the disc 208 as the disc 208 is rotated by the motor shaft 202. A continuous contact may eventually cause an outer edge 222 of the disc 208 to be worn away. Over a given period of time, the disc 208 may no longer contact the outer ring of rollers 206, to the same degree, based on the outer edge 222 of the disc 208 having been worn away. This loss in contact may cause the cycloid transmission 200 to experience a backlash (slippage) and not operate in an intended manner.

In one example, the adjustable ring 204 comprises a circumference 216 that can be adjusted in order to cause expansion of a radius of the disc 208. An expansion of the radius of the disc 208 may be achieved through the use of a plurality of set screws 212 and 214. The plurality of set screws 212 and 214 may be spaced equidistantly apart from each other. The plurality of set screws 212 and 214 are inserted through the disc 208 and into the adjustable ring 204. Adjusting a position of the plurality of set screws 212 and 214 within the adjustable ring 204 will cause an adjustment of a pressure of a fluid. If the adjustment causes an increase in the pressure of the fluid, then that will cause expansion of the radius of the disc

208. Expanding the radius of the disc 208 will bring the outer edge 222 of the disc 208 in closer proximity with the outer ring of rollers 206 and lower backlash during rotation of the disc 208.

Figure 3A:
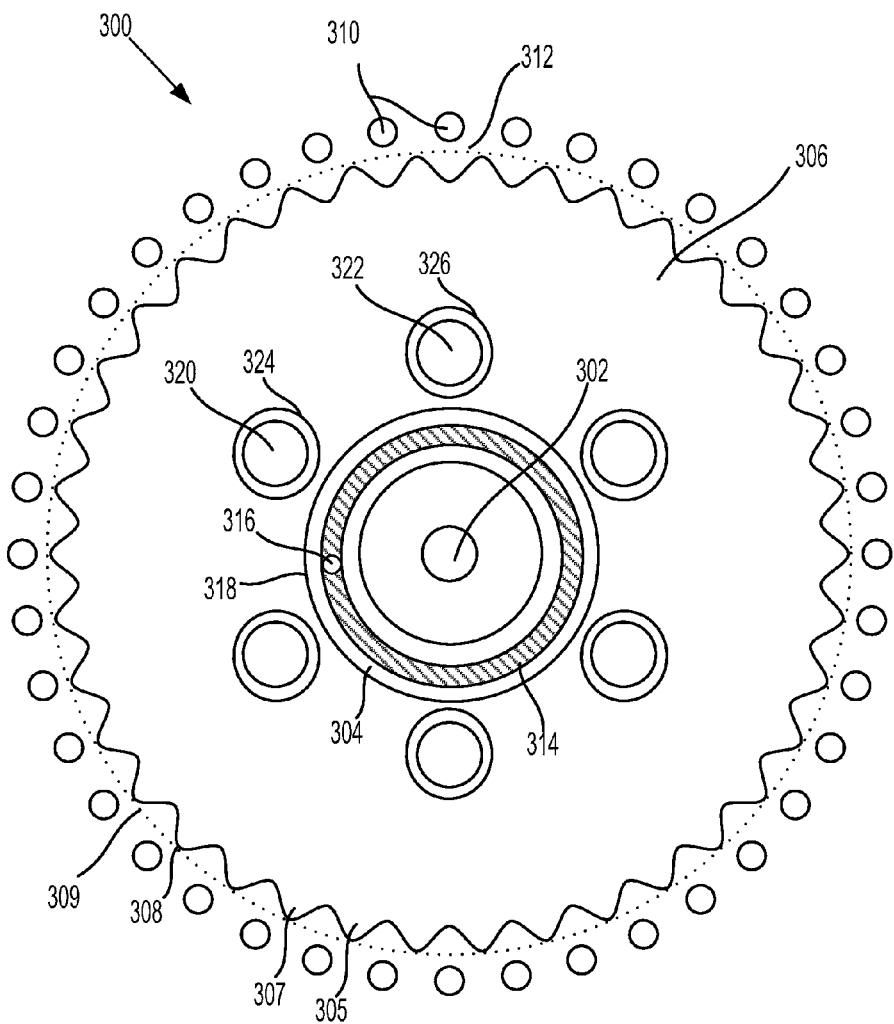
FIG. 3A illustrates another example cycloid transmission.

FIG. 3A illustrates another example cycloid transmission 300. A top view of the cycloid transmission 300 is shown. The cycloid transmission 300 comprises a shaft 302 attached to a disc 306. The shaft 302 is capable of rotating the disc 306. An outer ring of rollers 310 surrounds the disc 306. The outer ring of rollers 310 contacts the disc 306 as the disc 306 is rotated by the shaft 302.

The disc 306 includes a surface 308 on an outside perimeter 309 of the disc 306 that makes contact with the outer ring of rollers 310 as the disc 306 is rotated. The disc 306 also includes a plurality of circular openings 324 and 326 that are configured to receive a plurality of output shaft rollers 320 and 322. In one example, the disc 306 may include a plurality of teeth 307 and 305 along the outside perimeter 309 for interfacing with the outer ring of rollers 310.

A gap 312 exists between the surface 308 and the outer ring of rollers 310. While the disc 306 is rotated around the outer ring of rollers 310, the gap 312 is decreased as the surface 308 makes contact with the outer ring of rollers 310.

The cycloid transmission 300 as shown in FIG. 3A includes an adjustable ring 304. In this example, the adjustable ring 304 is interposed between the shaft 302 and the disc 306. The adjustable ring 304 includes an internal pressurized volume 314. The internal pressurized volume 314 may include fluid.

In one example, the adjustable ring 304 is sealed for a high pressure in order to permit an even radial force to be applied in all directions from the internal pressurized volume 314.

In one example, the adjustable ring 304 may be manufactured in a split manner as a first and second part. A portion of the internal pressurized volume 314 may be machined into the first and second part. In one example, the first and second part could be manufactured out of aluminum, steel, and stainless steel. The first and second part could then be welded back together. In one example, the first and second part could also be bolted together with a gasket seal.

An adjustable fastener 316 is shown to be inserted into the internal pressurized volume 314. Inserting the adjustable fastener 316 into the internal pressurized volume 314 may cause an increase in a pressure of the internal pressurized volume 314 around a circumference 318 of the adjustable ring 304. The increase in the pressure of the internal pressurized volume 314 will cause an expansion of a radius of the disc 306 and thereby decrease the gap 312 between the surface 308 and the outer ring of rollers 310. With an expansion of a radius of the disc 306, there will be increased contact between the disc 306 and the outer ring of rollers 310 as the disc 306 is rotated. The increased contact will lower backlash in order to improve the performance of the cycloid transmission 300.

Figure 3B:
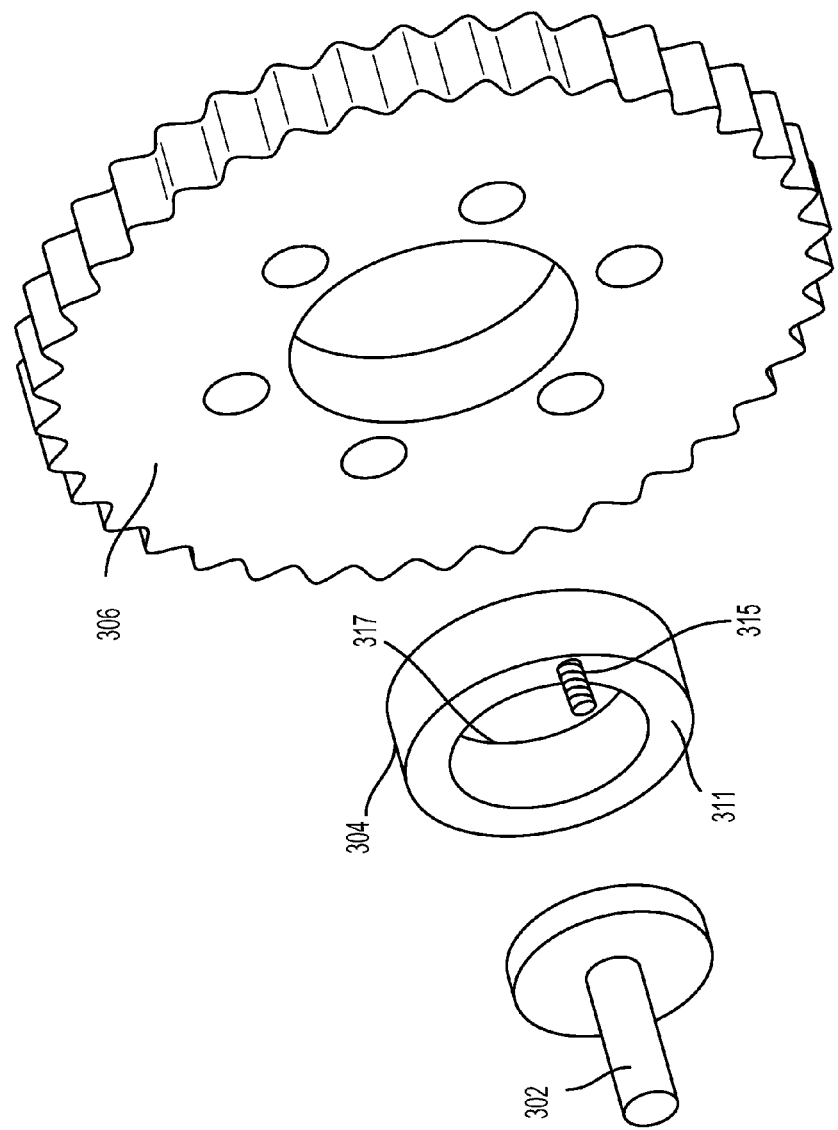
FIG. 3B illustrates a portion of an example cycloid transmission.

FIG. 3B shows an exploded view of subcomponents of the cycloid transmission 300. In one example the adjustable fastener 316 may comprise a set screw 315 as is shown in FIG. 3B. Adjusting the set screw 315 will serve to adjust the pressure of the internal pressurized volume 314. The adjustable fastener 316 may also comprise any threaded fastener that permits adjustment of a position of the adjustable fastener 316 within the internal pressurized volume 314.

Referring to FIG. 3B, in one example the adjustable ring 304 may comprise an annular body having a top circular base 311 and a bottom circular base 317. In an example, the set screw 315 may be inserted into the adjustable ring 304 through the top circular base 311.

Figure 3C:
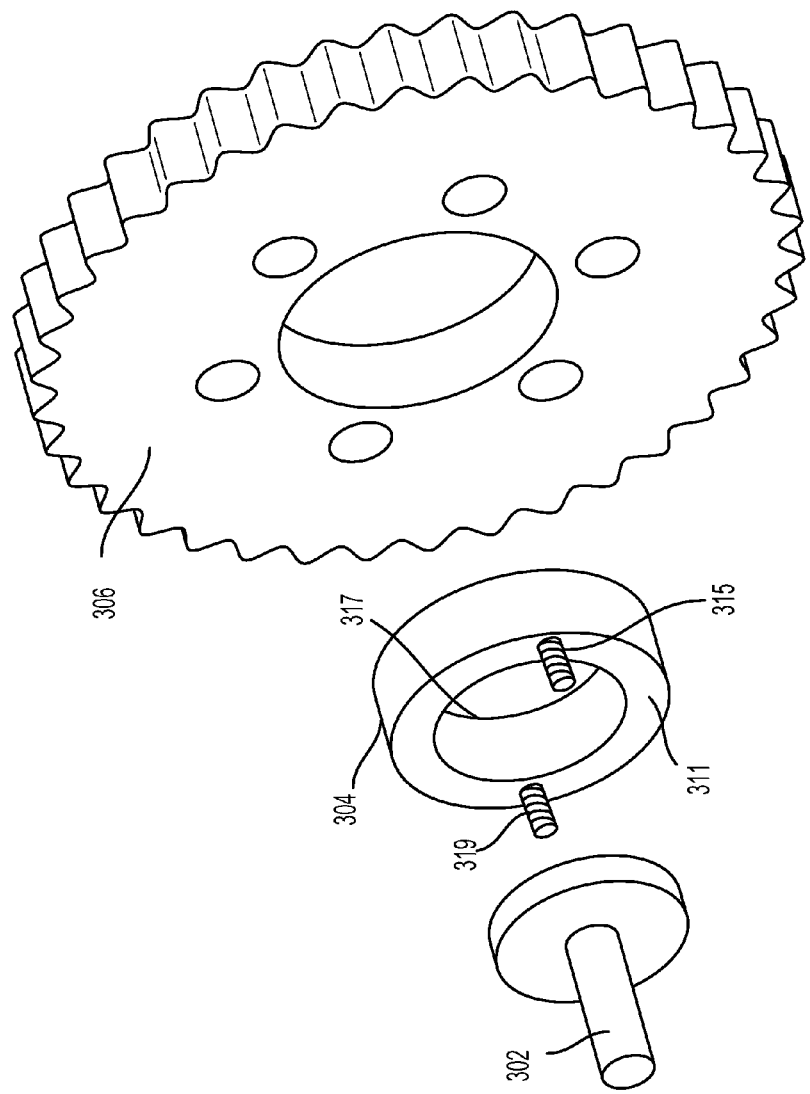
FIG. 3C illustrates another portion of an example cycloid transmission.

FIG. 3C shows an exploded view of subcomponents of the cycloid transmission 300. In one example referring to FIG. 3C, a plurality of set screws 315 and 319 may be inserted into the adjustable ring 304 through the top circular base 311.

Figure 4:
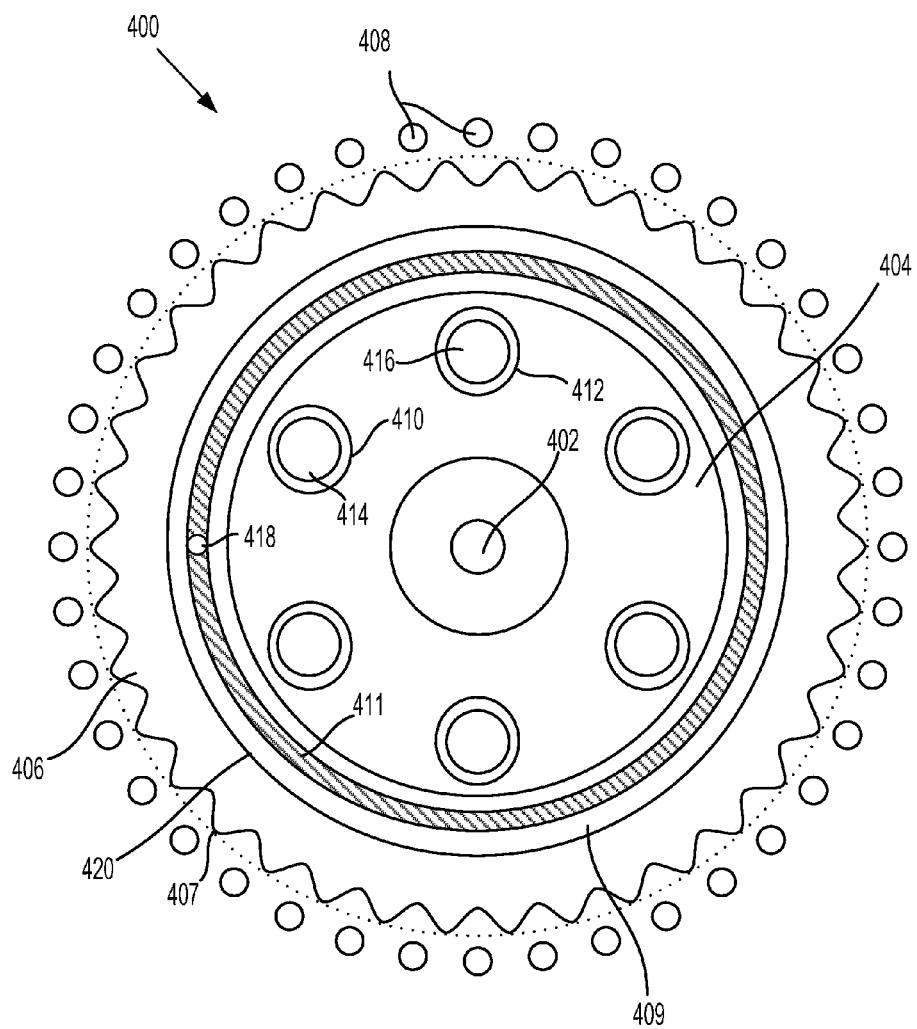
FIG. 4 illustrates another example cycloid transmission.

FIG. 4 illustrates another example cycloid transmission 400. A top view of the cycloid transmission 400 is shown in FIG. 4. The cycloid transmission 400 comprises a shaft 402 attached to a disc 404. The shaft 402 is capable of rotating the disc 404. An outer ring of rollers 408 surround the disc 404. As the disc 404 rotates, the outer ring of rollers 408 will make contact with the disc 404.

As is shown in FIG. 4, the disc includes a plurality of circular openings 410 and 412 configured to receive a plurality of output shaft rollers 414 and 416.

Referring to FIG. 4, a gear 406 for connecting with the outer ring of rollers 408 is shown. The gear 406 may include a plurality of teeth 407 for connecting with the outer ring of rollers 408. Over a period of time, the plurality of teeth 407 may wear away due to continuous contact with the outer ring of rollers 408. This may result in the cycloid transmission 400 to experience a backlash.

The cycloid transmission 400 comprises an adjustable ring 409. The adjustable ring 409 includes an internal pressurized volume 411. The adjustable ring 409 may be interposed between the gear 406 and the disc 404.

An adjustable fastener 418 is inserted into the internal pressurized volume 411. The insertion of the adjustable fastener 418 will cause an increase in a pressure around a circumference 420 of the adjustable ring 409. The pressure around the circumference 420 will cause an expansion of a radius of the disc 404 which will push the gear 406 into closer proximity with the outer ring of rollers 408.

Figure 5:
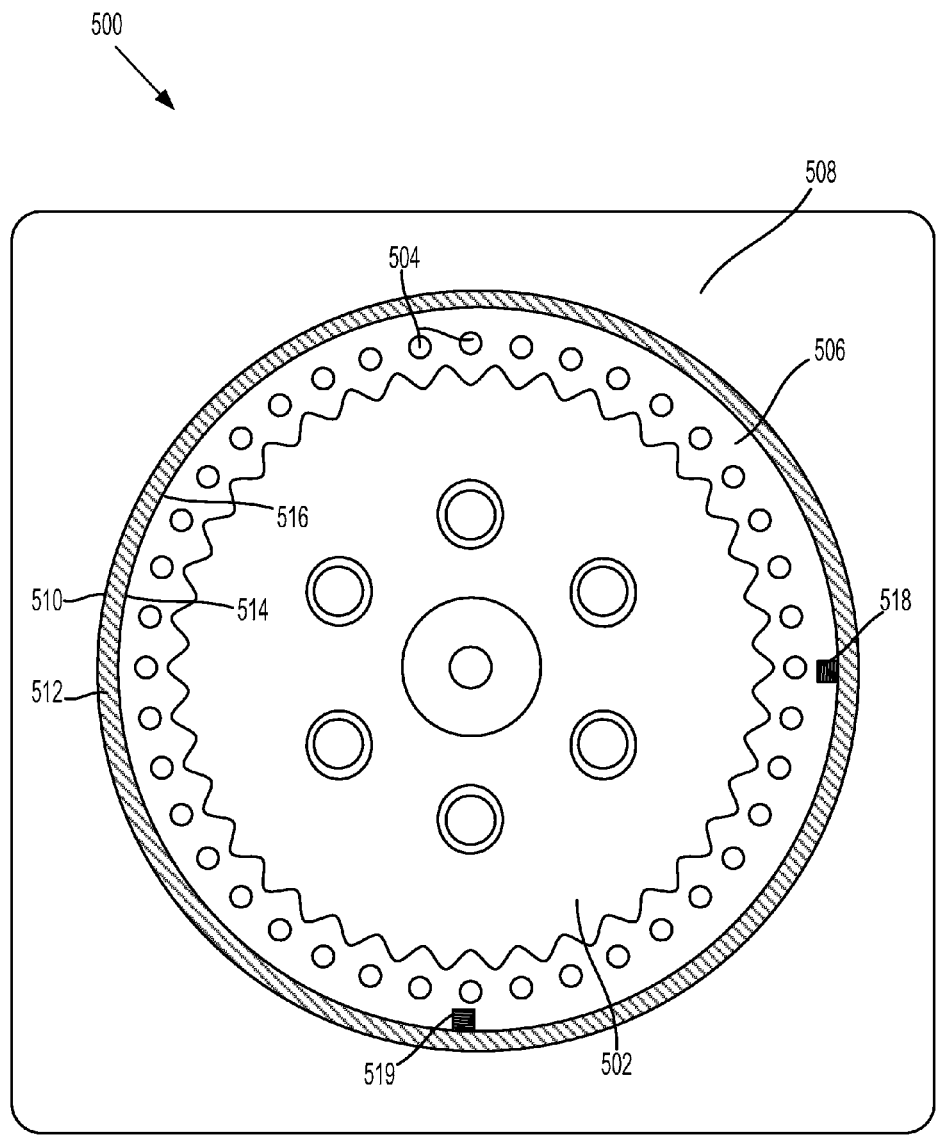
FIG. 5 illustrates another example cycloid transmission.

FIG. 5 refers to an example cycloid transmission 500. A top view of the cycloid transmission 500 is shown in FIG. 5. The cycloid transmission 500 comprises a disc 502 that is surrounded by an outer ring of rollers 504. The outer ring of rollers 504 makes contact with the disc 502 as the disc 502 rotates.

The outer ring of rollers 504 may comprise any given number of rollers based on a specification pertaining to the disc 502.

In one example, a primary housing 506 encompasses the outer ring of rollers 504. A secondary housing 508 encompasses the primary housing 506. An adjustable ring 510 is interposed between the primary housing 506 and the secondary housing 508.

The adjustable ring 510 includes an internal pressurized volume 512 that is adjustable around a circumference 514 of the adjustable ring 510. In one example, the internal pressurized volume 512 is filled with a fluid. Adjusting the internal pressurized volume 512 may cause a compression to be applied along an outside perimeter 516 of the primary housing 506. The compression will result in increased contact of the disc 502 to the outer ring of rollers 504 by forcing the outer ring of rollers 504 to be in a closer proximity to the disc 502.

Referring to FIG. 5, a set screw 518 is inserted through the primary housing 506 and into the adjustable ring 510. By applying a rotational force and thereby adjusting the set screw 518, there may be an increase in a pressure of the internal pressurized volume 512.

In one example, a plurality of set of screws 518 and 519 are inserted through the primary housing 506 and into the adjustable ring 510 as shown in FIG. 5. A given set screw of the plurality of set screws 518 and 519 can be adjusted in order to cause an increase in the pressure of the internal pressurized volume 512. The plurality of set screws 518 and 519 may be positioned along the circumference 514 of the adjustable ring 510 in order to increase the pressure of the internal pressurized volume 512 from a number of positions along the circumference 514 of the adjustable ring 510.

The secondary housing 508 may include a material with a higher hardness than what a different material that comprises the primary housing 506. The material of the secondary housing 508 may include a metal or any other solid. This will ensure that the secondary housing 508 is not affected by the increase in the pressure of the internal pressurized volume 512.

The primary housing 506 may be comprised of a solid that is less firm than the secondary housing. In one example, a synthetic material made from a wide range of organic polymers may be used. The synthetic material to be used in the primary housing 506 may exhibit a slightly elastic form based on the increase in the pressure of the internal pressurized volume 512 which will enable the outer ring of rollers 504 to be positioned closer to the disc 502.

Figure 6:
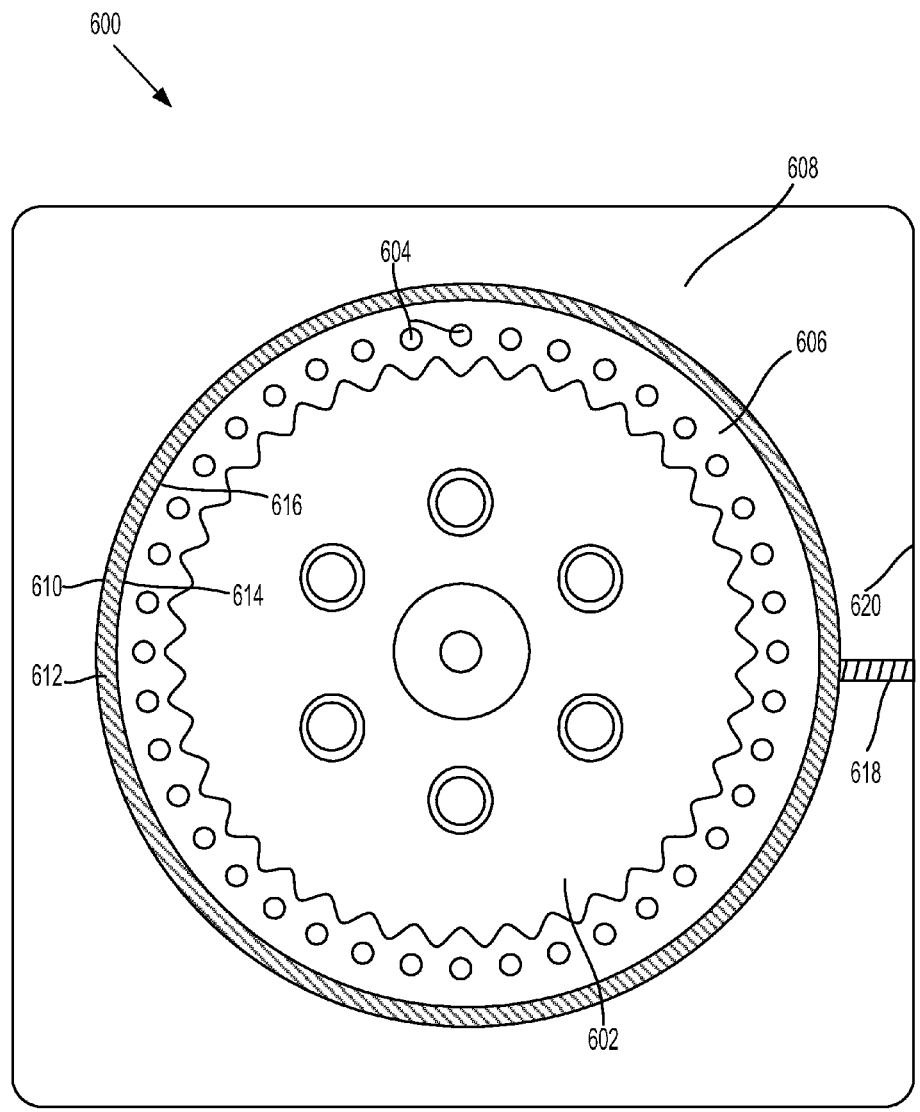
FIG. 6 illustrates another example cycloid transmission.

FIG. 6 refers to another example cycloid transmission 600. A top view of the cycloid transmission 600 is shown in FIG. 6. The cycloid transmission 600 comprises a disc 602 that is surrounded by an outer ring of rollers 604. The outer ring of rollers 604 makes contact with the disc 602 as the disc 602 rotates.

In one example, a primary housing 606 encompasses the outer ring of rollers 604. A secondary housing 608 encompasses the primary housing 606. An adjustable ring 610 is interposed between the primary housing 606 and the secondary housing 608.

The adjustable ring 610 includes an internal pressurized volume 612 that is adjustable around a circumference 614 of the adjustable ring 610. Adjusting the internal pressurized volume 612 may cause a compression to be applied along an outside perimeter 616 of the primary housing 606. The compression will result in increased contact of the disc 602 to the outer ring of rollers 604.

In one example, the internal pressurized volume 612 may be adjusted by a valve 618 coupled to the secondary housing. Referring to FIG. 6, the valve 618 may be accessed from the exterior 620 of secondary housing. This could enable a pressure of the internal pressurized volume 612 to be adjusted without the need to disassemble a component associated with the cycloid transmission 600.

Figure 7A:
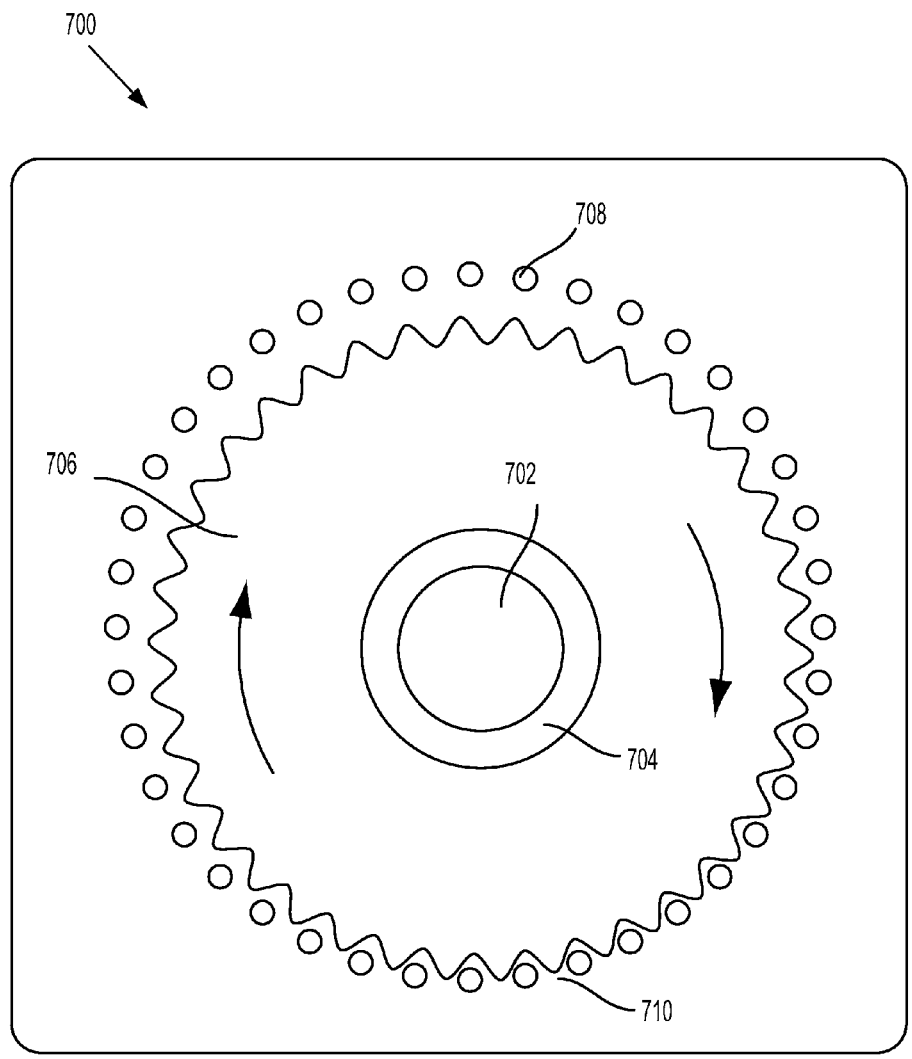
FIGS. 7A-7C illustrate different operating stages associated with an example cycloid transmission.
Figure 7B:
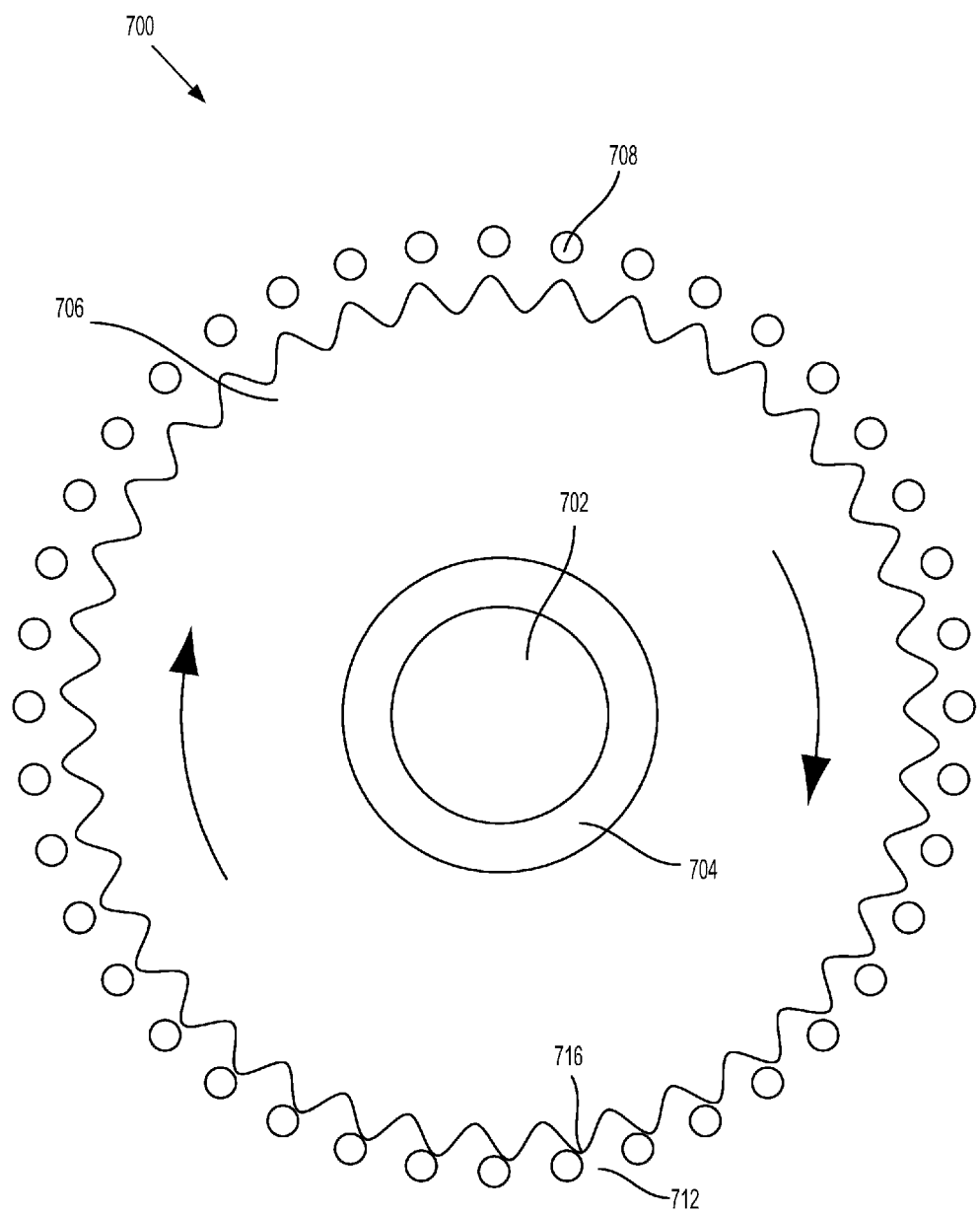
Figure 7C:
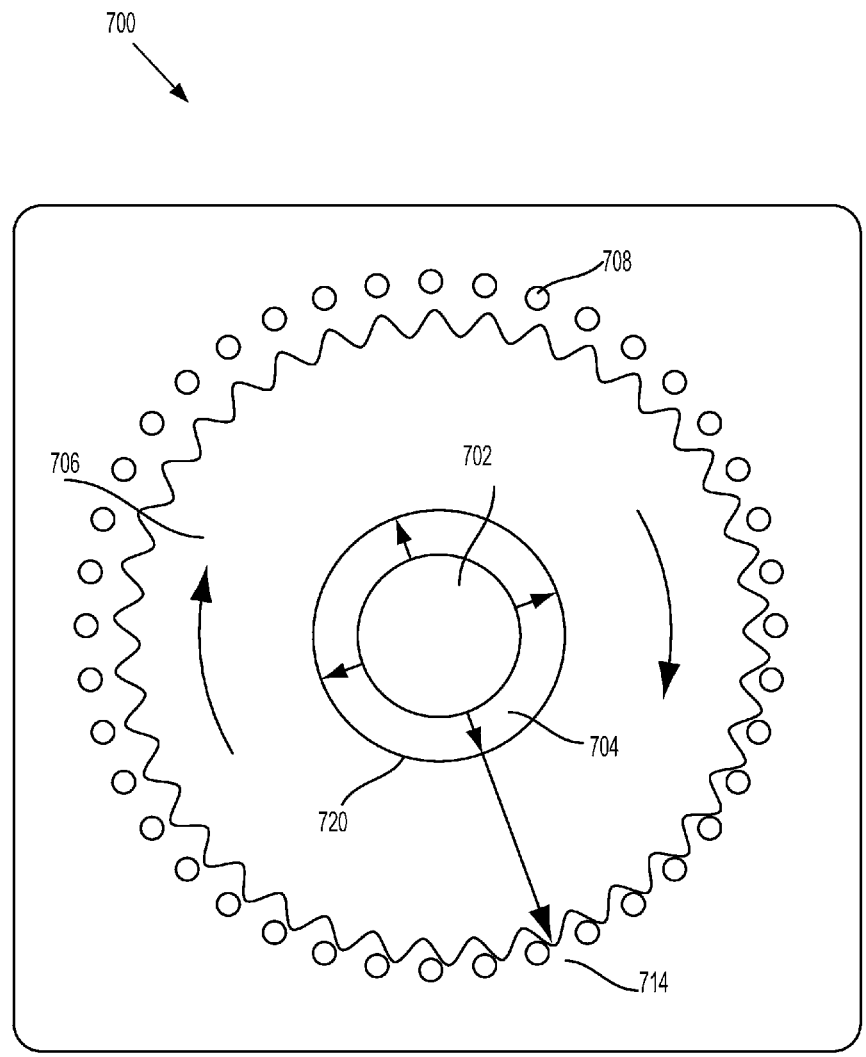

FIGS. 7A-7C illustrate three different stages pertaining to an operation of a cycloid transmission 700. Referring to FIG. 7A, the cycloid transmission 700 comprises a shaft 702 for rotating a disc 706. An adjustable ring 704 is interposed between the disc 706 and the shaft 702. The disc 706 rotates around an outer ring of rollers 708.

In one example, the disc 706 is about to make contact with a given roller of the outer ring of rollers 708 at position 710 during the operation of the cycloid transmission 700 as is shown in FIG. 7A. The proximity of the disc 706 to the outer ring of rollers 708 at a given position 710 permits the cycloid transmission 700 to perform as intended.

Referring to FIG. 7B, the cycloid transmission 700 is shown to operate while exhibiting a backlash. The backlash may be caused as a surface 716 of the disc 706 begins to wear away based on continuous contact with the outer ring of rollers 708.

In one example, at a given position 712 it can be seen that disc 706 no longer engages with the outer ring of rollers 708 as is shown in FIG. 7B. This may cause the cycloid transmission 700 to exhibit an unintended operating behavior due to backlash.

Referring to FIG. 7C, the cycloid transmission 700 is shown to operate with a lowered backlash. In one example, this may be achieved by adjusting a circumference 720 of the adjustable ring 704. The circumference 720 of the adjustable ring 704 may be adjusted by increasing a pressure contained by an internal pressurized volume of the adjustable ring 704.

As the circumference 720 of the adjustable ring 704 is adjusted, a radius of the disc 706 will increase. This will bring the disc 706 in closer proximity to the outer ring of rollers 708 such as at a given position 714. With an increased radius, the disc 706 will be able to engage with the outer ring of rollers 706 and the cycloid transmission 700 will perform as originally intended.

Figure 8:
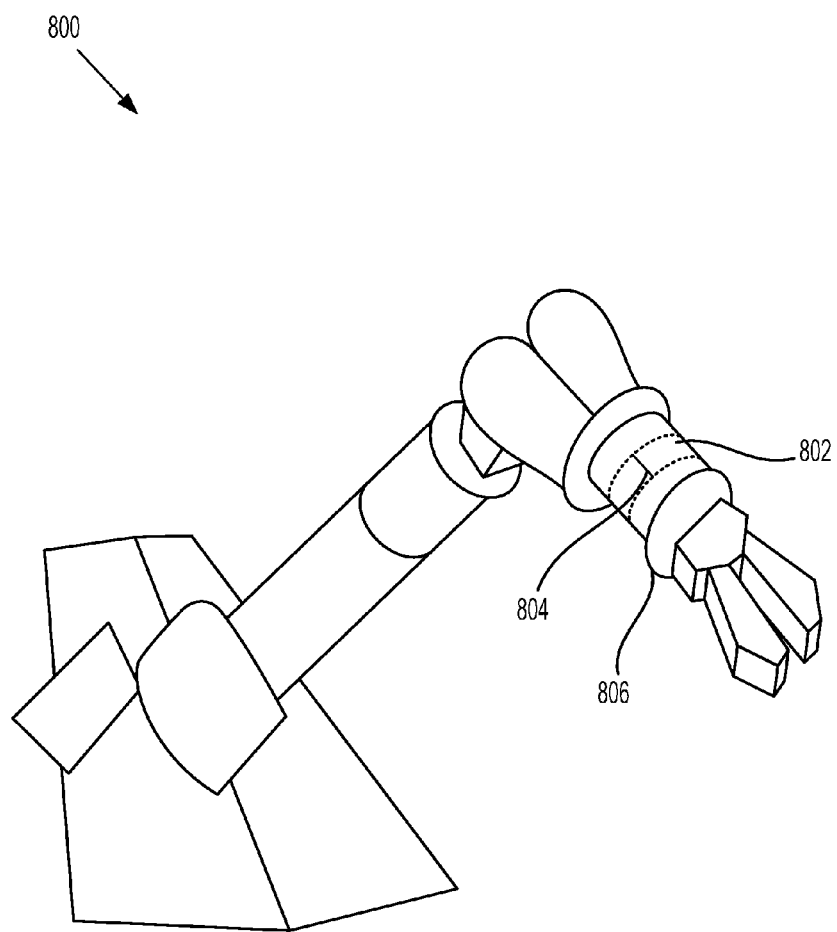
FIG. 8 illustrates an example robotic system.

FIG. 8 shows an example robotic system 800 where a cycloid transmission 802 may be implemented in order to assist with a rotational movement. The robotic system includes an end effector 806 that is used to interact within an environment.

A latch 804 is shown that permits access to the cycloid transmission 802 as is shown in FIG. 8. The ability to access the cycloid transmission 802 by use of the latch 804 will permit an adjustable ring of the cycloid transmission 802 to be adjusted.

The adjustable ring of the cycloid transmission 802 may be adjusted when the robotic system starts to exhibit a backlash associated with a movement of the end effector 806. In one example, the adjustable ring may be adjusted through the use of a fastener. The fastener may comprise a set screw or a plurality of set screws. In one example the adjustable ring may be adjusted through the use of a valve.

After the adjustable ring has been adjusted, the cycloid transmission 802 may have a lowered backlash and thereby allow for an intended operation of the robotic system 800. This will in turn permit the end effector 806 to be used in an effective manner.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A cycloid transmission comprising:
    a disc;
    a motor shaft coupled to the disc, and for rotating the disc;
    an outer ring of rollers surrounding the disc and contacting the disc as the disc rotates; and
    an adjustable ring interposed between the motor shaft and the disc, wherein a circumference of the adjustable ring can be adjusted in order to cause expansion of a radius of the disc resulting in increased contact of the disc to the outer ring of rollers and lower backlash during rotation of the disc.

2. The cycloid transmission of claim 1, wherein the adjustable ring is pressurized with a gas.

3. The cycloid transmission of claim 1, wherein the adjustable ring is pressurized with a fluid.

4. The cycloid transmission of claim 3, wherein the fluid is comprised of a silicone fluid that exhibits an increased viscosity when the fluid is heated so as to further cause adjustment of the circumference of the adjustable ring.

5. The cycloid transmission of claim 3, further comprising a set screw inserted through the disc and into the adjustable ring, wherein adjustment of the set screw causes adjustment of a pressure of the fluid.

6. The cycloid transmission of claim 3, further comprising a plurality of set screws spaced equidistantly apart from each other, inserted through the disc and into the adjustable ring, wherein adjustment of the plurality of set screws cause adjustment of a pressure of the fluid.

7. A cycloid transmission comprising:
- a disc, wherein the disc includes a surface on an outside perimeter of the disc;
- a shaft coupled to the disc, and for rotating the disc;
- an outer ring of rollers surrounding the disc and contacting the disc as the disc rotates; and
- an adjustable ring provided interior of the disc, wherein the adjustable ring includes an internal pressurized volume;
- an adjustable fastener inserted into the internal pressurized volume that causes an increase in pressure around a circumference of the adjustable ring, based on an amount of insertion into the adjustable ring, to cause expansion of a radius of the disc and decrease a gap between the surface of the outside perimeter of the disc and the outer ring of rollers, resulting in increased contact of the disc to the outer ring of rollers.

8. The cycloid transmission of claim 7, wherein the internal pressurized volume includes a fluid.

9. The cycloid transmission of claim 8, wherein the adjustable ring is interposed between the shaft and the disc.

10. The cycloid transmission of claim 8, wherein the adjustable fastener comprises a set screw, wherein adjustment of the set screw causes adjustment of a pressure of the fluid.

11. The cycloid transmission of claim 10, wherein the adjustable ring comprises an annular body having a top circular base and a bottom circular base, and wherein the set screw is inserted into the adjustable ring through the top circular base.

12. The cycloid transmission of claim 10, wherein the adjustable ring comprises an annular body having a top circular base and a bottom circular base; and
further comprising a plurality of set screws inserted into the adjustable ring through the top circular base, wherein the set screw is one of the plurality of set screws.

13. The cycloid transmission of claim 7, wherein the disc comprises a plurality of teeth along the outside perimeter of the disc for interfacing with the outer ring of rollers.

14. The cycloid transmission of claim 7, further comprising a gear for connecting with the outer ring of rollers as the disc rotates.

\* \* \* \* \*